United States Patent [19]

Onsrud

[11] 4,030,402
[45] June 21, 1977

[54] TENSIONING DEVICE FOR A DOUBLE DRIVE PROFILE CUTTER

[76] Inventor: Charles R. Onsrud, 516 Berkshire Drive, Statesville, N.C. 28677

[22] Filed: Dec. 9, 1975

[21] Appl. No.: 639,165

[52] U.S. Cl. .................................. 90/19; 40/11 A; 279/1 DC
[51] Int. Cl.² ......................................... B23C 5/26
[58] Field of Search ............... 90/11 A, 18, 19, 91, 90/92, 13.9; 408/130, 139, 140; 51/73 R, 290; 74/661, 664; 279/1 DC, 42, 76–78, 89, 90

[56] References Cited

UNITED STATES PATENTS

| | | | |
|---|---|---|---|
| 1,424,743 | 8/1922 | Smith | 279/89 |
| 1,724,741 | 8/1929 | Woodward | 90/18 X |
| 2,366,247 | 1/1945 | Fauser | 90/13.9 |
| 3,452,671 | 7/1969 | Stumpf et al. | 408/130 X |
| 3,566,714 | 3/1971 | Borello | 74/661 |
| 3,690,782 | 9/1972 | Petroff | 408/140 X |
| 3,901,295 | 8/1975 | Downing | 144/118 |

FOREIGN PATENTS OR APPLICATIONS 1,121,972  8/1956  France .................................. 90/19

*Primary Examiner*—Othell M. Simpson
*Assistant Examiner*—Z. R. Bilinsky
*Attorney, Agent, or Firm*—Neuman, Williams, Anderson & Olson

[57] ABSTRACT

A rotary profile cutting machine is provided which includes supports for the workpiece and a slender cutting tool wherein a workpiece can be moved into the bite of the rotating tool. The tool is held at opposite ends in tension so as to minimize torsional and bending loads on the tool.

6 Claims, 4 Drawing Figures

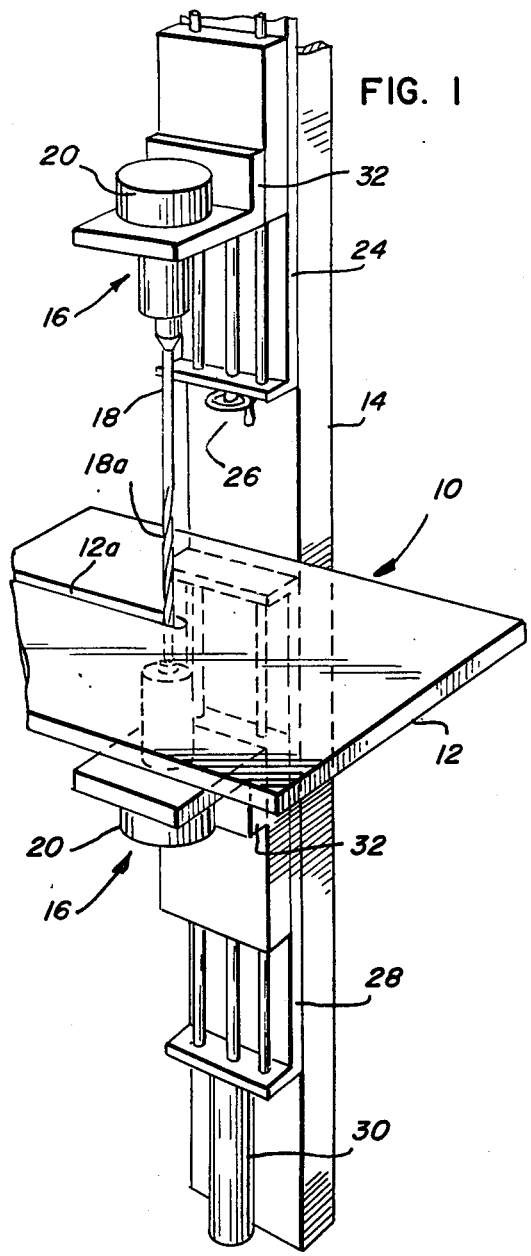
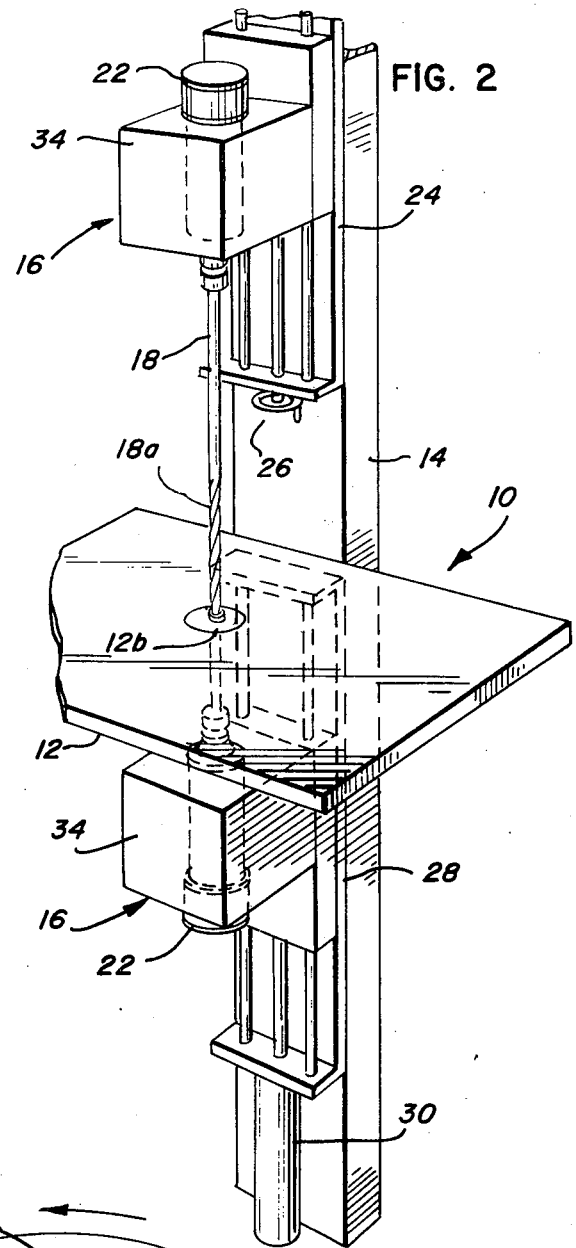
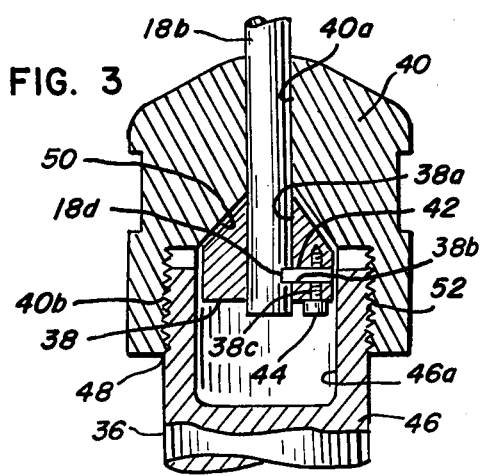
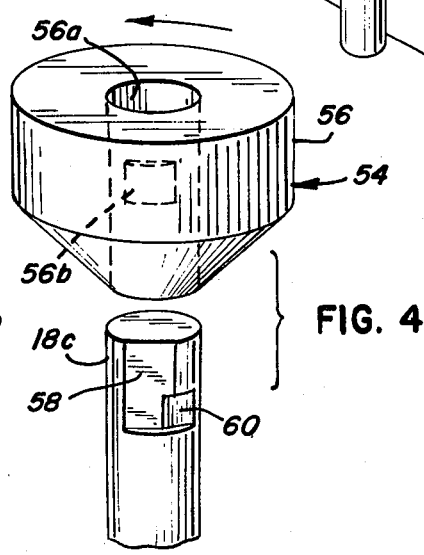

TENSIONING DEVICE FOR A DOUBLE DRIVE PROFILE CUTTER

BACKGROUND OF THE INVENTION

In the field of profile shaping wherein rotary cutters are used to shape or contour the edges of a workpiece according to a desired pattern, hand routers are generally used particularly on individual jobs not requiring large quantities of repetitive work. Routing machines normally consist of a high speed motor generally of the series wound electrical type to which is coupled a side milling tool, and in addition, such machines include a simple guide mechanism for adjusting the depth of tool cut in the plane formed by the cutter's axis and a line normal to the direction of cutter travel. The router cutters usually include a number of ridges defined by flutes to provide clearance for removal of cut material. In a hand tool the forces applicable to the cutter are generally minimal because the size of the machine, the physical capability of the user limits the amount of force which can be applied, the amount of material which can be removed during one pass, and the hardness of the material to be cut.

The invention herein uses the cutting principles and techniques of a routing machine, but is adapted to remove much greater quantities of harder materials in much shorter periods of time. That is to say, that the present machine is designed for repetitive production which must be as fast and as accurate as possible in order to produce a finished part which will fit its companion pieces, will have a high quality finish, and will cost as little as possible. As is well known in the art, such hand routing devices can be mounted and arranged such that the workpiece may be moved into the cutter according to a camming pattern or template. Production machines of the above-mentioned type are designed so that the drive motors and cutting tools are much heavier in order that the loads imposed by high speed cutting will not destroy the tool or machine. The amount of work performed by production profilers or shapers is substantially greater. To facilitate cutting speed, minimize power consumption and improve the versatility in cutting, a very slender cutting tool is desirable. The cutter tools are made of very hard materials such that any bending causes serious problems when the tool is distorted so that the cutter geometry (rake, clearance, etc.) is changed. Such loss of cutter geometry creates severe tool overloads and the tool quickly becomes dull and fractures by snapping in two. The bending loads imposed upon a slender cutting tool are a problem and limit tool life and accuracy.

Torsion is another form of loading which is imposed upon router cutting tools as a result of the nature of profile cutting. More specifically, each cutter ridge is literally scraping, conventional milling, tearing, or broaching the workpiece and tangential forces are imposed upon the cutting edges. These tangential forces result in great torsional stress about the axis of the cutter tool. The effect of such torsional loading or the torque reaction is greatest at the part of the tool farthest from the holder or tool support, and so the cutter has a tendency to be twisted against the direction of cutter rotation.

As can be appreciated from the nature of the production techniques that require cutting or profiling much thicker workpieces, and/or shaping harder materials at much greater cutting rate, and/or removing substantial amounts of material and producing a very smooth and accurate reproduction of the pattern, the machine and cutting tool must be as close to rigid as possible. Any bending, chipping or breaking of the cutting tool could result in machine down time and in the production of many parts which are unsatisfactory in terms of shape, finish and quality before the problem was noted and corrected.

SUMMARY OF THE INVENTION

The invention disclosed herein seeks to overcome the problem of tool bending, twisting and breakage by means of tensioning a slender cutting tool supported above and below the workpiece. The cutter is designed to be chucked or colletted at opposite ends and placed in tension such that the cutting portion is adequately supported therebetween. Consequently, the result is that the cantilever mounting of ordinary cutters is avoided and replaced with an improved beam loading. Preliminary experiments with an apparatus of the type disclosed show a material as thick as eight times the tool diameter can be profiled without tool breakage. Tool life is a function of the workpiece thickness, the tool diameter, the tool length, the feed rate, the depth of cut and the hardness of the workpiece material. A slender cutter mounted at opposite ends and placed in tension will last longer and perform better because it will not deflect and break as would a cutter with a cantilever mounting.

The concept for mounting the cutter in order to minimize the stress involved is not the complete solution because such cutters, when held as previously mentioned, in a high speed production machine must also include a double-ended drive system. The double-ended drive system includes a pair of motors mounted in axial alignment at the opposite ends of a slender profile cutting tool. The motors may be high speed, air driven or electrically powered such that they rotate the opposite ends of the cutter at the same speed. The tool can be connected to the motors by different means for each of the opposite ends of the tool. For example, at one end there is a cone clutch for equalizing any driving speed difference between the two motors during start-up. The motors are not mechanically connected, and during start-up before running speed is attained and the motors are locked together through the clutch, the motors can operate independently. Once speed is attained, the clutch can be engaged and the motors mechanically connected via the tool. At the other end of the cutting tool, there is a bayonet type drive engagement which is designed to restrain rotation opposite the direction of the drive and axial translation of the tool with respect to the bayonet connector once the engagement is complete.

In operation, the tool is inserted into the bayonet connector and a cone-shaped driven member is attached to the opposite end of the slender tool. The driven member is surrounded by clutch driving means and is connected to a motor such that the cone-shaped clutching surfaces can be brought into engagement with one another, equalizing the motor running speed. The clutch is directly connected to one motor carried on a hydraulically operated slide whereby the relative axial position of that motor is adjustable. Once the motor speed is attained, the axial position of the movable motor is changed so that the clutch is engaged and the slender cutter tool is rotated while in tension. The motors, the tool and the tool-driving system are in axial alignment such that the cutter portion of the tool is rotatably carried in tension therebetween.

A worktable is transversely disposed about the cutter portion of the tool and is carried on a common chassis with the cutter drive system. In some applications it has been found desirable to have a bushing located in the worktable as a guide for a template. By using a slender cutting tool, intricate inside and outside cutting patterns can be made as quickly as if sawed, but with the improved finish of a shaper. That is to say, that the slender tool cuts a small kerf removing less chips thus requiring less power and force, but more importantly, the slender tool, unlike a saw which it replaces, produces a finished surface and can cut in any direction thus allowing scallop cuts and the like. Consequently, tools so small in diameter that more than two cutting flutes thereon are impractical, can easily be used to cut at high speeds rather thick materials.

It is an object of this invention to provide a fast, accurate and economical machine tool for profile cutting.

It is another object of this invention to mount a profile cutter in tension such that little or no deflection results from cutting forces imposed on the cutter and thus, the finished workpiece has a surface with a high quality finish.

It is a further object of this invention to mount a profile cutter in tension such that normal bending and torsional loads are minimized thus reducing the incidents of breakage.

It is still a further object of this invention to provide a tensioning device for axial loading of a slender cutter tool.

It is yet a further object of this invention to include a system for rotating a slender cutter at high speeds from both ends of the cutter at the same time.

The additional objects and advantages of the present invention will become apparent as the following description proceeds and the features of novelty which characterize this invention are pointed out with particularity in the claims annexed to and forming a part of this specification.

DESCRIPTION OF THE DRAWINGS

FIG. 1 is a perspective view of the invention with air turbine motors;

FIG. 2 is a perspective view of an alternate form of the invention with high speed electric motors;

FIG. 3 is a cross-sectional view of the clutch and tool-holding arrangement shown in connection with the upper driving motor in FIGS. 1 and 2; and FIG. 4 is a perspective view showing the locking clutch arrangement used to connect the tool to the lower motor of FIGS. 1 and 2.

FIGS. 1 and 2 disclose a profile cutting machine 10 having a workpiece supporting table 12, an upright chassis 14 for supporting the table 12 and the cutting drive system 16. System 16 is equipped to carry a relatively elongated and slender cutting tool 18 having a centrally located cutting portion 18a and a pair of driven ends 18b (FIG. 3) and 18c (FIG. 4). System 16 not only drives tool 18 at high speed but also applies tension to the tool to overcome torsional and bending loads imposed during cutting.

Drive system 16 includes a pair of motors 20 (FIG. 1) and 22 (FIG. 2). Motors 20 and 22 are supported on the chassis 14 in a similar fashion. The only difference between motors 20 and 22 is that motor 20 is an air turbine such as the Onsrud Machine Works pneumatic turbine motor type D, which is capable of 50,000 RPM at 100 lbs. of air pressure and motor 22 is electric. In order to simultaneously drive a slender cutting tool 18, the same high speed motors 20 have to rotate in opposite directions and have to be powered by a common regulated air supply. The air supply is not shown since such systems are well known. Motors 22 are electrical high speed motors such as, for example, the Super Cycle Powerquills by Rockwell Manufacturing Company of Racine, Wis. Such motors are capable of up to 2 to 3 H.P. and speeds from 7,000 to 120,000 RPM's.

The motors 20 or 22 are carried in axial alignment on chassis 14 by means of sliding guideways. The guideways and other similar components in FIGS. 1 and 2 are numbered identically since the type of motor used is the major difference in those figures. The upper guide 24 is equipped with a hand wheel 26 for manual adjustment of the position of the upper guide 24. The lower guideway 28 includes an air hydraulic cylinder system 30 arranged to move the lower guide 28. A particular mounting system which works well for the upper guideway 24 is the Master Machine Tools, Inc. Select-O-Size SOS 6-S-B-HF which includes the feed assembly having precision acme lead screws with micrometer dials graduated in 0.001 inch increments.

The lower guide 28 is also a Master Machine Tools, Inc. Select-O-Size, with an air hydraulic slide such as their Model No. SOS 6-S-B-CEP. Such air hydraulic slides include adjustable limiting stops and air cylinders to provide the moving force coupled to hydraulic cylinders to damp the feed motion whereby the feed rate is provided by controlling the flow of oil through a needle valve.

In FIG. 1, mounting brackets 32 are used to support motors 20 in cantilever fashion to the moving portions of guides 24 and 28. Similarly, brackets 34 are used to support motors 22 in cantilever fashion on the movable portions of guides 24 and 28 in FIG. 2. Consequently, motors 20 are held in axial alignment with each other by brackets 32 and motors 22 are held in axial alignment with each other by brackets 34.

Worktable 12 in FIG. 1 includes a slot 12a. Slot 12a is provided to facilitate the placement of tool 18 in machine 10 of FIG. 1. In FIG. 2, an alternate arrangement is shown for table 12, wherein a bushing 12b is carried in table 12. Bushing 12b is in the form of a removable disc which includes an upstanding annular which surrounds the cutter 18. The ring is used to guide the pattern which carries the piece to be cut piggyback fashion whereby only the workpiece is cut to shape as the pattern follows along the ring.

Turning now to FIGS. 3 and 4, there are shown the portions of system 16 which drive the lower and upper ends of tool 18, respectively. Although in low horsepower applications (less than 1HP.) a standard collet arrangement at each end has been found acceptable in equalizing differences in starting torque, a different system 16 is necessary for high horsepower machines. For example, lower drive 36 includes a clutching means having a driven part 38 and a driving member 40. Part 38 attaches to the tool 18 at the end 18b by means of a slot 18d cut into the circumference of tool 18. Slot 18d is in the nature of a keyway positioned transverse to the axis of tool 18. The key 42 for slot 18d is carried on driven part 38 and retained thereto by a screw 44. Key 42 is in the nature of an eccentric which cam locks into slot 18d. Driven part 38 is generally cylindrical having an axial bore 38a therethrough a flat face at one end and a cone-shaped clutch surface at the other. In addition, part 38 includes a slot 38b for receiving key 42 and hole 38c for threaded clamping screw 44. Slot 38b is transversed to bore 38 and hole 38c is parallel to bore 38a and extends from the flat face of part 38 into the transverse slot 38d. The key 42 has a threaded opening therethrough such that when end 18b of the tool 18 is placed in bore 38a, the key 42 can be rotated to engage the slot 18d and retain and drive the tool 18.

In order to drive part 38, there is a threaded collar 46 connected to a lower motor 20 or 22. The collar 46 includes a hollow center portion 46a which receives the part 38, and external threads 48 to which a driving member 40 may be threadably connected. Driving member 40 is cup-shaped and has a bore 40a axially through the bottom 50 of the cup. The bottom 50 has an inside conically shaped clutch surface to cooperate with the conical face of part 38. Surface 50 surrounds the bore 40a. The side walls 40b of cup-shaped driving member 40 includes threads 52 which cooperate with threads 48 on collar 46. Before part 38 is attached to 18b, member 40 must be slipped over end 18b with the cup-shaped portion extending toward the distal part of 18b, after which part 38 is secured as described and collar 46 may then be threadably connected to member 40, capturing the end 18b of tool 18 or more particularly, part 38 thereon within the hollow center 46a. Any tension on tool 18 will be sufficient to cause the coneshaped clutch face of part 38 to engage the similar surface 50 of member 40 thus forming a clutch.

FIG. 4 shows the bayonet connector 54 used to retain other end 18c of tool 18. Connector 54 includes a hub 56 which is drivingly mounted to either upper motor 20 to 22. Hub 56 is annular in configuration and has an axial bore 56a therethrough for receiving end 18c of tool 18. Within bore 56a there is a flat abutment 56b spaced midway in the bore at one side thereof and transverse to the axis of the bore. Abutment 56b is used to lock end 18c within bore 56a, thus preventing axial translation and rotation in the direction opposite the drive of said hub 56. On end 18c is a pair of coacting flat surfaces 58 and 60. Surface 58 is merely a flat extending from the distal part of 18c along the shank of the tool. Such flats can be milled before the tool is hardened. Similarly, flat 60 is also milled at the inward end of flat 58 forming a notch extending circumferentially from one lower corner or side of flat 58. The notch formed by flat 60 is of adequate width and length to receive abutment 56b. In the assembly of 18c to hub 56, the flat 58 is aligned with abutment 56b and tool 18 is slid into bore 56a, such that flat 58 passes over abutment 56b. When abutment 56b reaches the bottom inwardmost extension of flat 58, tool 18 is rotated slightly against the direction of tool rotation so that abutment 56b twists into the notch formed by flat 60 and is so locked in a bayonet fashion. As long as the hub 56 is rotated in a direction which forces abutment 56b into the notch formed by flat 60, tool 18 is held for axial and rotary connection to hub 56. In low horsepower applications where a clutch is not necessary, the bayonet lock herein can be used at both ends. Similarly, in high horsepower applications with a clutch, the bayonet lock can be used to hold the driven portion of the clutch or can be used in combination with a collet whereby the rotation of the tool is controlled by the collet and the axial translation of the tool is controlled by the bayonet lock.

From the foregoing, it should be apparent that the tool 18 is inserted in the upper drive 54 twisted and locked in bayonet fashion, the lower slide 28 is raised so that the threads 48 and 52 can be joined after which the slide 28 can be lowered lowering either motor 20 or 22 thereon causing the clutch to engage the surface 58 and applying an axial load to the tool 18. In FIG. 2, bushing 12b is removable to allow the lower drive system 16 to be raised for convenience in connecting the tool to the lower motor 22. If an inside cut has to be made, the lower motor 22 and the connected tool 18 can be lowered automatically so that the workpiece with a predrilled hole can be placed over bushing 12b. The tool 18 is then raised and connected to upper motor 22 whereby the machine 10 is ready to profile cut or shape the inside of the workpiece.

Loads of 100 to 150 lbs. have been effective in reducing deflection of the cutter 18 at the workable 12 to 50 percent of what it would be with an unloaded tool. Similarly, tools of 3/16 inch diameter are capable of cutting a thickness of 2½ inches. Such tools work best when turned between 20,000 RPM and 50,000 RPM, in order to produce a surface cutting speed in excess of 5,000 feet per minute. By using small diameter tools, the machine 10 can easily contour cut and scallop cut thick workpieces forming shapes and finishes which are unobtainable with larger cutters or saws. It has been found that such a slender cutter will cut faster than the usual profile cutter with its ⅝ to ¾ inch diameter with less power and will produce a surface finish equivalent to that produced by larger cutters at speeds equal to a rough sawing operation.

While there has been shown and described various embodiments of the present invention, it will be apparent to those skilled in the art that further changes and modifications may be made without departing from the invention in its broader aspects and it is, therefore, contemplated in the appended claims to cover all such changes and modifications as fall within the true spirit and scope of the present invention.

What is claimed as new and desired to be secured by Letters Patent of the United States is:

1. A machine for profile cutting a workpiece, comprising a slender axially elongated double-ended high speed cutting tool rotatable about its longitudinal axis and having a centrally located workpiece cutting portion and end portions, the length of said workpiece cutting portion being substantially greater than any lateral dimension thereof, said cutting portion having a substantially uniform lateral dimension throughout; axially aligned and rotatably mounted tool holding means in drive engagement with said tool end portions; drive means for each tool holding means, said drive means coacting with one another for overcoming dynamic loads imposed upon said tool cutting portion when the latter is rotating at high speed during oblique and cross cutting through the full thickness of the workpiece; a support for supporting the workpiece in a plane disposed intermediate the tool holding means and intersecting the tool rotary axis; a chassis supporting said tool holding means, said drive means and said workpiece support in a predetermined relationship; and guide means mounted on said chassis and engaging said drive means for controlling axial movement of one drive means and a corresponding tool holding means whereby the tool is subjected to a predetermined amount of axial tension overcoming rhythmic and cyclic torsional and bending loads imposed thereon during cutting of the workpiece.

2. The machine of claim 1 wherein said drive means are a pair of spaced-apart motors rotating said tool in the same direction and at the same angular velocity; said tool holding means being driven by said motors while engaging said tool to prevent rotational and axial translation thereof relative to said motors.

3. A profile cutting machine comprising a slender axially elongated double-ended high speed cutting tool rotatable about its longitudinal axis and having a centrally located cutting portion and end portions, the length of said tool being substantially greater than any lateral dimension thereof and the lateral dimension of said tool being substantially uniform throughout said cutting portion, axially aligned and rotatably mounted tool holding means in engagement with the tool end portions, one of said holding means being selectively engaged by clutch means, first drive means drivingly connected to a first of said tool holding means for rotating same, second drive means drivingly connected to a second of said tool holding means for rotating same, said tool holding means when rotating overcoming dynamic cutting loads imposed upon the tool during oblique and cross cutting through the full thickness of a workpiece when the latter is moving laterally of the rotary axis of said tool, said first and second drive means simultaneously rotating at high speed said holding means and said cutting tool about said axis at substantially the same angular velocity for overcoming rhythmic and cyclic torsional and bending loads imposed upon said tool during cutting of the workpiece, a workpiece support mounted in a lateral plane disposed transversely to the axis of tool rotation for supporting the workpiece between said first and second holding means thereby intersecting the central cutting portion of said tool, a chassis supporting said first and second tool holding means, said first and second drive means and said workpiece support in the defined relationship, and guide means engaging said chassis and said first and second drive means effecting controlled axial movement of said first tool holding means relative to said chassis for engaging said clutch means as said first and second holding means are axially separated whereby said tool is subjected to a predetermined amount of axial tension to overcome rhythmic and cyclic torsional and bending loads imposed thereon during cutting.

4. The machine of claim 3 wherein said first and second drive means include motors, said first drive means driving said clutch means and said second drive means rotating said second tool holding means whereby the opposite ends of said tool are rotated in the same direction and at substantially the same angular velocity.

5. The machine of claim 4 wherein said clutch means includes a driving member connected to one of said motors and having a first drive facing and a motor attachment portion, a driven member attached to an end of said tool for transmitting rotary and axial loads having a second drive facing for engagement with said first drive facing upon application of an axial loading to said tool whereby torque and tensile force are transmitted by said facings from said member to said tool.

6. The machine of claim 5 wherein said driven member is attached to said tool end by cam locking means including an eccentric carried on said driven member for engagement with a slot formed in said tool end portion and disposed transverse to the shank of said tool upon rotation of said eccentric.

* * * * *

UNITED STATES PATENT AND TRADEMARK OFFICE
CERTIFICATE OF CORRECTION

PATENT NO. : 4,030,402
DATED : June 21, 1977
INVENTOR(S) : Charles R. Onsrud

It is certified that error appears in the above-identified patent and that said Letters Patent are hereby corrected as shown below:

Column 4, line 49, after "annular" insert -- ring -- lines 56 & 57, "horespower" should be -- horsepower --

Column 5, line 36, "to" should read -- or --

Column 6, line 20 "workable" should read -- worktable --

Signed and Sealed this

Fourth Day of October 1977

[SEAL]

Attest:

RUTH C. MASON
*Attesting Officer*

LUTRELLE F. PARKER
*Acting Commissioner of Patents and Trademarks*